3,366,174
METHOD FOR WATERFLOODING
PETROLIFEROUS STRATA
Howard H. Ferrell and David E. Baldwin, Jr., Ponca City, Okla., assignors to Continental Oil Company, Ponca City, Okla., a corporation of Delaware
No Drawing. Filed June 4, 1964, Ser. No. 372,666
12 Claims. (Cl. 166—9)

This invention relates to an improved method for recovery of hydrocarbons from petroliferous subterranean strata. More particularly, the present invention relates to an improved waterflooding process which may be utilized to recover substantial amounts of petroleum from subterarnean formations.

A large percentage of the oil in petroliferous strata is held within the rock of the strata by the surface forces betwen the rock, the oil and the formation water. As a result, a substantial portion of this oil usually remains in the rock even when wells traversing the strata are no longer productive. Various secondary recovery techniques, such as thermal recovery, gas injection and waterflooding, have been suggested for the recovery of this fixed oil which remains in the formation after it can no longer be produced by primary recovery methods. Of these secondary recovery techniques, waterflooding is quite commonly chosen, and a multitude of methods have been suggested for improving the efficiency and economy obtained from the practice. Such methods frequently include a water-soluble surfactant in the waterflood.

Although these water-soluble surfactants have sometimes been found to substantially increase the amount of oil recoverable from a petroliferous formation, and to substantially increase the injectivity rates of water into an injection well during a waterflooding procedure, we have now determined that total oil recovery and injectivity rates may be even further increased by using an effective amount of an "oil recovery agent" consisting of substantially water-insoluble, oil-soluble, organic, polar material with the aqueous surfactant solutions. In a preferred embodiment, the recovery agent is chosen from the group consisting of an n-aliphatic alcohol containing from about 6 to about 12 carbon atoms and an organic acid containing from about 4 to about 20 carbon atoms.

Our efforts to determine the exact mechanism by which the "oil recovery agents" taught herein function in increasing the amount of oil recoverable from the use of water-soluble surfactants have provided some indication of what occurs in the water-surfactant-"oil recovery agent"-oil system. The "oil recovery agents" tend to concentrate in the oil at the oil-water boundary, and photomicrographs indicate that a complex, unusual micellar structure is formed by penetration of the oil into the water. The result is an absence of any distinct oil-water interface. It is believed that the oil is then displaced by the water in a manner similar to that which occurs in secondary and tertiary recovery of oil by so-called miscible displacement—that is using a driving fluid which is miscible in the oil.

In any event, interfacial tension measurements indicate that the presence of "oil recovery agents" of the type described results in a substantial lowering of the interfacial tension between the aqueous surfactant solution and the oil. Also, the percent of the total oil originally in place in the formation which is recoverable by waterflooding is substantially increased, as is the rate at which the water may be injected into the formation.

From the foregoing discussion, it will have become apparent that it is an important object of this invention to increase the amount of oil which can be recovered from subterranean, petroliferous formations by injecting into the formations water containing a water-soluble surfactant.

An additional object of the invention is to provide an improved method of secondary and tertiary recovery of oil from underground reservoirs.

Yet another object of the invention is to provide an additive for an aqueous hydrocarbon recovery solution, which additive may be prepared from readily available, relatively inexpensive materials.

Other objects and advantages of the present invention will become apparent from a perusal of the detailed description thereof presented hereinafter.

One form of the present invention can be summarized as a method for recovering hydrocarbons from petroliferous formations which comprises the steps of:
(a) injecting into such formations a treating composition which comprises:
  (i) an effective amount of a water-soluble surfactant, and
  (ii) an effective amount of an "oil recovery agent," and
(b) moving said composition in the formation toward a recovery well while withdrawing liquid from the formation through the recovery well.

The water-soluble surfactants which may be used in conjunction with this invention may be chosen from a wide variety of anionic or nonionic materials well known in the art for their surface-active properties. Among the anionic types of surfactants are the water-soluble, organic acid salts of the general formula

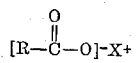

wherein R is an alkyl radical having from 1 to about 14 carbon atoms, or is an alkyl substituted aryl wherein the alkyl portion has from about 1 to about 12 carbon atoms, and wherein the aryl includes compounds having from 1 to about 3 rings; and wherein X is a cation chosen from the group consisting of sodium, lithium, potassium, ammonium, amine and substituted amines. Examples of these materials are to be found in sodium stearate, potassium oleate and lithium linoleate.

Other suitable materials include organic, water-soluble sulfates of the general formula

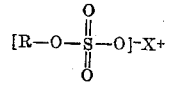

wherein R is an alkyl radical having from 1 to about 14 carbon atoms, or is an alkyl substituted aryl wherein the alkyl portion has from about 1 to about 12 carbon atoms and wherein the aryl includes compounds having from 1 to about 3 rings; and wherein X is a cation chosen from the group consisting of sodium, lithium, potassium, ammonium, amine and substituted amines. Specific examples of these materials are to be found in sodium lauryl sulfate, ammonium dodecylsulfate and lithium octylphenoxyethyl sulfate.

Other anionic surfactants useful in practicing this invention are the water-soluble sulfonates of the formula

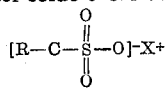

wherein R is an alkyl radical having from 1 to about 14 carbon atoms, or is an alkyl substituted aryl wherein the alkyl portion has from 1 to about 12 carbon atoms and wherein the aryl includes compounds having from 1 to about 3 rings; and wherein X is a cation chosen from the group consisting of sodium, lithium, potassium, ammonium, amine and substituted amines. Specific examples of these anionic sulfonate surfactants which may be utilized are potassium dodecylbenzene sulfonate, sodium xylene sulfonate and lithium diisopropylbenzene sulfonate.

Among the nonionic water-soluble surfactants which may be utilized in the invention are ethylene oxide condensates of the type formula $R-O(C_2H_4O)_nH$, wherein R is an alkyl radical having from about 6 to about 20 carbon atoms, or is an alkyl substituted aryl wherein the alkyl portion has from about 1 to about 12 carbon atoms and wherein the aryl includes compounds having from 1 to about 3 rings; and wherein $n$ is an integer of from about 8 to about 50. Ethylene oxide reaction products of higher fatty acids, as well as of fatty acid esters, including ethylene oxide reaction products of fatty acid esters of anhydrosorbitols may also be utilized in conjunction with the present invention. Lauric, palmitic, oleic, and stearic acids are commonly used for such esters which may generally be referred to as polyoxyalkylene derivatives of hexitol anhydride partial long chain fatty acid esters. The hexitol is usually sorbitol.

In general, an aqueous solution containing at least about 5,000 p.p.m. by weight of X-alkyl aryl sulfonates is preferred for use in the process of the invention. As is pointed out in more detail herein, the symbol X is used to designate a cation chosen to produce a water-soluble material, while the alkyl aryl portion of these sulfonates is characterized by a molecular weight of from about 120 to about 218. When these sulfonates are used as a mixture, as is preferred, at least 90 percent by weight of the alkyl aryl portions of the individual compounds must have a molecular weight falling within this 120–218 range. Additionally, the average combining weight of the total mixture must also be from about 120 to about 218.

Preferably, a mixture of sulfonate compounds is employed which is derived from hydrocarbon distillate streams produced in the process of petroleum refining which have a boiling range of from about 300° F. to about 610° F., with from about 25 percent to about 85 percent of the mixture boiling between 450° F. and 600° F. An appreciation of the various types of aromatic or aryl nuclei which are present in a typical distillate heating oil stream may be obtained by reference to Table I which sets forth the results obtained upon analysis of the aromatic fraction of such a stream by chromatographic and mass spectrometer techniques.

TABLE I.—LIQUID VOLUME PERCENT DISTRIBUTION OF AROMATICS IN TYPICAL NO. 1 DISTILLATE HEATING OIL

| Carbon Number | Alkyl-benzenes $C_nH_{2n-6}$ | Indanes $C_nH_{2n-8}$ | Indenes $C_nH_{2n-10}$ | Naphthalenes $C_nH_{2n-12}$ | Acenaphthenes $C_nH_{2n-14}$ | Acenaphthylenes $C_nH_{2n-16}$ | Total |
|---|---|---|---|---|---|---|---|
| 7 | 0.3 | | | | | | |
| 8 | 0.7 | | | | | | |
| 9 | 1.0 | | 0.2 | | | | |
| 10 | 1.0 | | 0.3 | 0.3 | | | |
| 11 | 0.8 | 0.3 | 0.2 | 0.4 | | | |
| 12 | 0.4 | 0.5 | 0.2 | 0.5 | | | |
| 13 | 0.4 | 0.4 | 0.1 | 0.4 | | | |
| 14 | 0.3 | 0.4 | 0.1 | 0.2 | 0.5 | 0.4 | |
| 15 | 0.2 | 0.3 | 0.1 | 0.1 | | | |
| 16 | 0.2 | 0.2 | 0.1 | <0.1 | | | |
| 17 | 0.1 | 0.1 | <0.1 | <0.1 | | | |
| 18 | 0.1 | 0.1 | <0.1 | <0.1 | | | |
| 19 | | <0.1 | | | | | |
| Total | 5.5 | 2.3 | 1.3 | 1.9 | 0.5 | 0.4 | 11.9 |

The cation, X, of the alkyl aryl sulfonates preferred for use in the invention may be chosen from a relatively large group of cations, either elemental or radical. In general, any cation is satisfactory which forms an alkyl aryl sulfonate or mixture of sulfonates which has a water-solubility of at least about 5,000 p.p.m. at reservoir conditions. With this criterion as the only limitation to a choice of a cation, a large group of cations can be suggested. Within this group are the alkali metals, such as sodium, potassium, lithium, and rubidium; certain other metals such as magnesium, calcium, and strontium; and certain nonmetals, such as ammonium, and any of the amines. This latter group may include the primary amines, such as methylamine and beta naptha amine; the secondary amines, such as dimethylamine and methylaniline; and the tertiary amines, such as trimethylamine and diethylaniline. Further, the amines can be aromatic, such as aniline and p-toluidine, or aliphatic, such as n-butylamine or ethylamine.

Preference will ordinarily be given to ammonium, substituted ammonia, and the alkali metals for use as the cation in the sulfonate compounds since the salts of these cations generally demonstrate greater solubility in the water injected into the formation. Ammonium and substituted ammonia are the preferred cations for use in the invention because of the relatively great solubility of their compounds in the injected aqueous solution. Of the alkali metals which can be used, sodium is preferred.

The hydrocarbon nucleus of the sulfonate compounds may likewise be derived from a large group of different starting materials. As has been previously indicated, the molecular weight of the hydrocarbon nuclei of at least 90 percent by weight of the individual compounds in mixtures of the additive compounds must be from about 120 to about 218, and the average molecular weight of the hydrocarbon nuclei of all the individual compounds used in the process should also fall within this range of from about 120 to about 218.

The alkyl portion of the hydrocarbon nucleus may be either straight chain or branched, and the aryl portion of the nucleus may be either mono- or polycyclic and may be derived from such compounds as benzene, naphthalene, anthracene, indane, tetralin, indene, dihydronaphthalene, acenaphthene, perinaphthane, dihydroanthracene, acenaphthalene, fluorene and phenanthrene. Additionally, so long as the hydrocarbon nucleus of the sulfonate or mixture of sulfonates is within the molecular weight range set forth above, the aryl portion of the compound need not be mono-substituted with an alkyl group, but may also be poly-substituted with a plurality of the same or different alkyl groups where such materials are readily available. Going further, no advantage has been recognized for compounds wherein the alkyl portion assumes a particular position with respect to the aryl groups.

Specific examples of sulfonate compounds which may be used in practicing the present invention are as follows: ammonium methylethylbenzene sulfonate, sodium isopropylbenzene sulfonate, potassium isopropylnaphthalene sulfonate, lithium methylanthracene sulfonate, ammonium n-butylbenzene sulfonate, ammonium dipropylbenzene sulfonate, potassium isobutylbenzene sulfonate, methylamine methylpropylbenzene sulfonate, n-butylamine isoamylbenzene sulfonate, aniline n-heptylbenzene sulfonate, dimethylaniline n-butylbenzene sulfonate, potassium sec-heptylindene sulfonate, diethylaniline n-octylnaphthalene sulfonate, ammonium di-n-butyl-benzene sulfonate, magnesium propylhexylbenzene sulfonate, naphthanolamine 2-ethylhexylbenzene sulfonate, n-butylamine n-butylbenzene sulfonate, dimethylamine methylanthracene sulfonate, p-toluidene isopropylnaphthalene sulfonate, trimethylamine nonylbenzene sulfonate, sodium decylbenzene sulfonate, α-naphtanolamine 2,3-dimethylpentylbenzene sulfonate and ammonium 2,2,3-trimethylbutylbenzene sulfonate.

As previously indicated, the most preferred refinery streams which may be sulfonated to yield sulfonic acid precursors of sulfonate salts for use in the present invention are catalytically and thermally cracked distillate streams having boiling ranges within the range of from about 300° F. to about 610° F. For example, a power fuel cracked distillate stream produced by catalytic cracking and having a boiling range of from about 375° F. to about 550° F. provides an especially good source material which yields a highly effective mixture of sulfonates upon sulfonation and neutralization. Streams of this general type may be produced by subjecting a suitable cracking stock, such as de-asphalted gas oil, heavy residual oils and light and heavy gas oils to one of the catalytic cracking processes well-known in the petroleum refining industry.

A power fuel cracked distillate generally contains from about 40 to about 80 percent by weight aromatics and has an average molecular weight of from about 160 to about 200. The chemical and physical properties of a typical power fuel cracked distillate stream are described in Table II.

TABLE II

| | |
|---|---|
| Gravity, ° A.P.I. | 31.2 |
| Distillation, ASTM-D-86 | |
| I.B.P. | 380 |
| 5 | 417 |
| 10 | 442 |
| 20 | 460 |
| 30 | 474 |
| 40 | 486 |
| 50 | 498 |
| 60 | 509 |
| 70 | 522 |
| 80 | 538 |
| 90 | 559 |
| 95 | 578 |
| E.P. | 602 |
| Percentage paraffins and naphthenes | 50.0 |
| Percentage olefins | 8.0 |
| Percentage aromatics | 42.0 |
| UOP "K" factor | 11.22 |
| C/H ratio | 7.42 |
| Average molecular weight | 180 |
| Kinematic viscosity at 122° F., centistokes | 1.90 |

Another distillate stream which is produced by catalytic cracking which afford a preferred source material for the water-soluble sulfonates useful in the process of the invention is a light cycle gas oil stream having a boiling range of from about 350° F. to about 600° F. and an average molecular weight of from about 180 to about 205. The aromatics content of this stream is from about 30 to about 65 percent by weight, depending upon the materials charged to the catalytic cracking unit and the crude source from which such materials are derived. The A.P.I. gravity of light cycle gas oils ranges from about 18 to about 32 and their average U.O.P. "K" factor is from about 10.5 to 11.5.

The chemical and physical properties of a typical light cycle gas oil are set forth in Table III.

TABLE III

| | |
|---|---|
| Gravity, ° A.P.I. | 33.4 |
| Distillation, ASTM–D–158 | |
| I.B.P. | 420 |
| 5 | 460 |
| 10 | 468 |
| 20 | 471 |
| 30 | 477 |
| 40 | 486 |
| 50 | 495 |
| 60 | 504 |
| 70 | 516 |
| 80 | 530 |
| 90 | 552 |
| 95 | 577 |
| E.P. | 606 |
| Percentage paraffins and naphthenes | 54.0 |
| Percentage olefins | 5.0 |
| Percentage aromatics | 41.0 |
| UOP "K" factor | 11.38 |
| C/H ratio | 7.12 |
| Average molecular weight | 196 |
| Kinematic viscosity at 122° F., centistokes | 2.20 |

Another cracked stream which may be directly sulfonated to produce a mixture of sulfonic acids which, when neutralized and mixed, as hereinafter described, with alcohols, constitute valuable waterflood additives is a stream known in the petroleum refining industry as thermal cycle oil. It is also sometimes termed thermal cracked burner distillate. This material may be produced by subjecting to thermal cracking a coker gas oil from a delayed coking unit and/or cycle gas oil from a catalytic cracking unit. Other normally used charge stocks to a thermal cracking unit, such as reduced crude oil, may also be employed. The thermal cracking is carried out in a manner well-undestood in the art, such as, for example, subjecting the charge stock to temperatures of from about 850° F. to about 1200° F. and pressures of from about 15 p.s.i. to about 1500 p.s.i., depending upon whether the thermal cracking is carried out in the liquid phase or in the vapor phase.

Thermal cycle oil produced in the described manner is characterized in having a boiling range of from about 375° F. to about 600° F. and an average molecular weight of from about 160 to about 190. The thermal cycle oil will generally contain from about 40 percent by weight to about 80 percent by weight aromatics. The properties of a typical refinery stream of this material are set forth in Table IV.

TABLE IV

| | |
|---|---|
| Gravity, ° A.P.I. | 28.9 |
| Distillation, ASTM–D–158 | |
| I.B.P. | 352 |
| 5 | 411 |
| 10 | 426 |
| 20 | 446 |
| 30 | 460 |
| 40 | 472 |
| 50 | 483 |
| 60 | 493 |
| 70 | 506 |
| 80 | 522 |
| 90 | 545 |
| 95 | 569 |
| E.P. | 612 |
| Percentage paraffins and naphthenes | 45.0 |
| Percentage olefins | 6.0 |
| Percentage aromatics | 49.0 |
| UOP "K" factor | 11.85 |
| C/H ratio | 7.15 |
| Average molecular weight | 167 |
| Kinematic viscosity at 100° F., centistokes | 1.52 |

Although the fraction of the described refinery light oil and distillate streams which is actually sulfonated may be obtained either prior to the sulfonation step, or, alternatively, by subjecting the unsegregated stream to direct sulfonation and then separating out the sulfonated materials, it is ordinarily preferred to directly sulfonate the described streams and then separate the sulfonated materials from the unreacted materials. Sulfonation procedures are well-known in the art and may be carried out by any one of several methods.

Neutralization of the sulfonic acids obtained by sulfonation of the described refinery streams may also be be carried out in any one of several methods well-known in the art. See for example, copending U.S. Patent application Ser. No. 289,206, filed June 20, 1963, now abandoned.

The surfactant concentration in the injected aqueous solution may vary over a relatively wide range of concentrations. At the lower limit of concentration is the requirement that the concentration of any given surfactant be sufficient to insure that micelles of the surfactant are formed therein. Stated in a slightly different manner, for any given surfactant the lowest concentration in which that surfactant should be utilized corresponds to the critical micelle concentration of that surfactant in the injected fluid.

The upper limit of recommended surfactant concentration, when the surfactant is injected in a solution, as contradistinguished from an independent slug, corresponds to the maximum solubility in the injected fluids for the particular surfactant under consideration. Solubility will, of course, depend upon many factors and may in any particular instance be determined by simple laboratory experiments well understood by those skilled in the art.

Generally, it is preferred to use sufficient surfactant to provide an aqueous solution that is at least about 60% saturated with said surfactant under reservoir conditions.

The amount of the preferred X-alkyl aryl sulfonate or mixture of sulfonates used in the treated injection water may range from about 0.5 percent by weight to about 60 percent weight. The higher concentrations may be used especially effectively in the case of certain types of sulfonate salts, such as ammonium sulfonate, with the optimum concentration in any specific instance depending, among other things, upon the solubility of the particular sulfonate salt in water and the phase behavior of the injected aqueous solution.

It has been found that, when ammonium sulfonate salts are utilized, concentrations up to about 60 percent by weight may be used especially effectively because of the relatively high solubility of the ammonium salts in water. In the case of most of the other salts of the sulfonic acids, concentrations above about 35 percent by weight are preferably not used. On the other hand, when concentrations of the sulfonate of less than about 0.5 percent are used, the effectiveness of the additive composition is severely reduced. This appears to be due to the fact that the critical micelle concentrations of the additives of the present invention are not reached in concentrations much lower than 0.5 percent by weight. Preferably the ammonium sulfonate salts are used in concentrations of from about 5% to about 50% by weight of injected solution.

As in the case of the water-soluble surfactants, there is a wide choice of "oil recovery agents" which may be utilized in the practice of the present invention. In general, it may be stated that those materials suitable for use as "oil recovery agents" are organic, polar, water insoluble, oil-soluble compounds. Within this wide group of compounds are mercaptans having from about 6 to about 12 carbon atoms, such as 1-octanethiol; organic acids having from about 4 to about 20 carbon atoms and preferably from about 14 to about 20 carbon atoms; amines including mono and poly alkyl substituted amines wherein the alkyl portion has from 1 to about 20 carbon atoms, such as tributylamine and n-octyl amine as well as methylhexyl amine; and alcohols having from about 6 to about 12 carbon atoms, such as octanol, hexanol, etc.

The above organic acids, together with the alcohols, form the preferred "oil recovery agents" for use in this invention. As such, these acids may be either straight or branched chain or may contain ring structures. For instance, valeric, caprylic and lauric are examples of straight chain acids which may be utilized; while suitable branched chain acids may include 2-ethylhexanoic acid; 2,2-dimethylpropanoic acid; and 3-methyl octanoic acid. Going further, solid acids, such as p-toluic acid, β-naphthoic acid and adipic acid, all of which are aromatic, may be utilized, provided suitable solvents, such as ethyl alcohol, etc., are also used.

In addition to the above types of molecular structure which may be utilized in the acid molecule, it is likewise possible to use unsubstituted acids, or substituted acids, such as glyceric acid, 3-chlorobutanoic acid and β-hydroxypropionic acid. Moreover, either saturated acids, such as the above, and unsaturated acids, such as caproic, oleic, linoleic and crotonic acids are suitable for use with this invention.

A second preferred group of compounds for use as oil recovery agents are the aliphatic alcohols containing from about 6 to about 12 carbon atoms. These compounds may be either primary, secondary or tertiary and may have either straight or branched chains. The preferred alcohols for use in the invention are straight chain aliphatics and contain between about 6 and about 10 carbon atoms. Specifically, hexanol, decanol, octanol, etc. may be utilized with good results.

The concentration of "oil recovery agents," when such agents are injected with a surfactant, may be expressed as a relatively wide range. As a lower limit, an amount equal to at least about 0.5 part by weight per million parts of injected fluid should be utilized while not more "oil recovery agent" should be included in the injected fluid than will go into solution therein. In general it is preferred to use from about 1 percent by weight to about 35 percent by weight "oil recovery agent" in the injected fluid. Preferably, however, the amount of acid or alcohol used will be from about 5 percent by weight to about 10 percent by weight.

When a concentration of alcohol greater than about 10 percent is employed, some increase in water injectivity and oil recovery may be realized, but the process becomes less economic by reason of the increased cost as balanced against the increased recovery. Moreover, in many instances, problems are encountered as a result of the tendency of a plurality of phases to be formed in the system when in excess of about 10 percent by weight of the alcohol is employed.

In practicing the present invention, improved water injectivities and oil recoveries can be attained whether the "oil recovery agent" and sulfonate are used in the initial phases of the waterflood operation, or whether it is used only after a conventional waterflood has reached its normal economic limit, hereinafter frequently referred to as the "initial point of residual saturation," $ROS_1$. A preferred manner of practicing the present invention, however, is to utilize the additive at the start of the waterflood operation without waiting until the water-oil cut reaches a relatively high level of water concentration. For a given concentration of additive, the total oil recovery may be slightly increased when the initially injected water is treated, as compared to the results obtained when the initial point of residual saturation is reached before injection of the additive. However, of more importance is the fact that the sooner the additive is utilized in the waterflood process, the less the total amount of fluid which must be injected for obtaining the total economically recoverable hydrocarbon.

In a preferred embodiment, the "oil recovery agent" is injected in a slug prior to injection of surfactant in the initial stages of a conventional waterflood program. This slug may be either a single slug of material or it may consist of a plurality of small slugs of the agent alternating with small slugs of water, gas or some other suitable fluid. The possible desirability for utilizing the plurality of relatively small alternating slugs will depend upon a number of factors, including mobility of the formation treating composition in the reservoir. In any event, the precise method of application of this material will be obvious to others skilled in the art with knowledge of a particular set of reservoir conditions.

The total amount of the composition of the invention which is utilized in the waterflood procedure may vary widely. Generally, from about 40 to about 400 pounds of the formation treating composition per acre foot of formation to be flooded will give some improvement in result whether such composition is injected as a single solution or as independent slugs of "oil recovery agent" and surfactant. Within this range, from about 200 to about 300 pounds per acre foot is generally preferred. It will be realized, of course, that these ranges do not represent theoretical limits to the amounts of active material which may be used, but rather are presented as examples of quantities which most commonly will be employed in the field.

By way of further, nonlimiting example the following systems may be utilized in practicing the present invention:

| Surfactant: | Oil recovery agent |
|---|---|
| Potassium dodecylbenzene sulfonate | 1-octanethiol. |
| Ammonium light cycle gas oil sulfonate | n-Octyl alcohol. |
| Ammonium lauryl sulfate | Tall oil. |
| Sodium dodecylbenzene sulfate | Tall oil heads. |
| Polyethoxylated oleyl amine | Triethanolamine. |
| Sodium octyl benzene sulfonate | Oleic acid. |
| Polyethoxylated stearic acid | Octyl amine. |
| Sodium naphthalene sulfonate | Hexyl amine. |
| Potassium octyl xylene sulfonate | Caproic acid. |

To provide a fuller understanding of the nature of this invention, the following specific examples are given which demonstrate the improvement in oil recovery and water injectivity which may be realized when the "oil recovery agent"—surfactant compositions of this invention are employed as compared with the use of the aqueous surfactant compositions alone. The examples further illustrate the greater effectiveness which may be attained by using certain preferred alcohols and fatty acids in combination with the preferred sulfonates as hereinbefore described.

EXAMPLE 1

In order to evaluate the effectiveness of "oil recovery agents" used in this invention in lowering the interfacial tension existing at the interface between an aqueous surfactant solution, and the oil to be displaced from a subterranean petroliferous formation, a mixture was prepared consisting of a pale oil (a solvent refined Mid-Continent lubricating oil having a viscosity of 80 S.S.U. at 100° F.) and an aqeuous solution containing 5 percent by weight of an ammonium sulfonate derived from a thermal cycle oil having the properties hereinbefore described. To the mixture of aqueous ammonium alkyl aryl sulfonate solution and pale oil were then added various concentrations (based on the weight of the aqueous sulfonate solution) of n-octanol. Interfacial tension measurements were made corresponding to the various amounts of alcohol added. The result of the alcohol addition on interfacial tension is dramatically illustrated by the data summarized in Table V which was taken from a curve plotted from a representative number of data points. In referring to this table, it may be clearly seen that the addition of n-octanol to the oil-sulfonate system results in a very substantial lowering of the interfacial tension between the two liquids with the maximum effect of the alcohol being attained at a concentration of about 7 percent by weight.

TABLE V

| Percent n-octanol | Interfacial tension (dynes/cm. 2) |
|---|---|
| 0 | 3.00 |
| 1 | 1.20 |
| 2 | 0.96 |
| 3 | 0.77 |
| 4 | 0.62 |
| 5 | 0.51 |
| 6 | 0.43 |
| 7 [1] | 0.40 |

[1] Limit of solubility.

EXAMPLE 2

In order to evaluate the effect of adding the "oil recovery agents" prescribed by the invention to a waterflood containing the water-soluble surfactants of the type hereinbefore described, a number of different waterflood additive compositions were compared by means of a standardized flood-pot laboratory test.

In this test, Berea sandstone outcrop cores 2 inches in diameter and 3 inches in length were mounted horizontally and were initially saturated with a brine solution containing 50,000 parts per million sodium chloride. The cores were then reduced to irreducible water saturation by injecting 80 pale oil into the cores. Waterflooding of the cores was then commenced and was continued until residual oil saturation ($ROS_1$) was reached. 10 milliliters of water treated with either a particular X-aryl alkyl sulfonate mixture or with a sulfonate-alcohol composition to be evaluated were then injected into the core, followed by renewed waterflooding with untreated water which was continued until a new residual or irreducible oil saturation ($ROS_2$) was obtained. The additional amount of oil recovered was used as the basis for comparison. Comparisons were also made of the percentage increase in rates of water injectivity obtained from the different additives.

Table VI is a compilation of the test data for a number of different alkyl aryl sulfonate solutions. These data represent averages of a number of runs which were carried out for each additive using Berea sandstone cores of the type described.

Table VII sets forth the results obtained when a number of the identical alkyl aryl sulfonates used in the tests yielding the data set forth in Table VI were combined with various quantities of a number of the alcohols prescribed by the present invention and the sulfonate-alcohol compositions used to treat water injected into the Berea cores in accordance with the described procedure.

varied between initial injection and injection at residual oil saturation (ROS$_1$). The total fluid throughput to arrive at final residual oil saturation was measured, as was the percentage of the original oil in place which was recovered. These data are summarized in Table VIII wherein it will be noted that the total throughput had little effect on the total percentage of the original oil in place

TABLE VI

| Derivation of NH$_4$ Sulfonate Additive | Average Combining Weight | Sulfonate Concentration of Aqueous Solution in Percent by Weight | Additional Oil Recovered (Percent OOIP) | Increase in Injectivity, Percent |
|---|---|---|---|---|
| Dodecylbenzene Intermediate | 264 | 49 | 9.7 | 211 |
| Kerosine | 251 | 45 | 9.5 | 209 |
| Straight Run [1] Distillate Heating Oil | 251 | 45 | 15.4 | 264 |
| Cracked [2] Distillate Power Fuel | 257 | 44 | 16.2 | 272 |
| Straight Run Diesel Fuel [3] | | 40 | 18.1 | 231 |
| Cracked Thermal Cycle [4] Oil | 261 | 43 | 23.3 | 337 |
| Cracked Light Cycle Gas [5] Oil | 250 | 49 | 21.8 | 260 |
| Cycle Gas Oil | 335 | 39 | 7.7 | 134 |

[1] An ammonium sulfonate derived from a straight run distillate having a boiling range from 360° F. to 554° F. with about 45 percent by weight boiling between 450° F. and 600° F.
[2] An ammonium sulfonate derived from a cracked distillate having the properties described in Table II. (Boiling range 380° F. to 602° F. with about 85 percent by weight boiling between 450° F. and 600° F.)
[3] An ammonium sulfonate derived from a straight run distillate having a boiling range 390° F. to 612° F. with about 85 percent by weight boiling between 450° F. and 600° F.)
[4] An ammonium sulfonate derived from a cracked distillate having the typical properties described in Table IV. (Boiling range 352° F. to 613° F. with about 75 percent by weight boiling between 450° F. and 700° F.)
[5] An ammonium sulfonate derived from a cracked distillate having the typical properties described in Table III. (Boiling range 420° F. to 606° F. with about 85 percent by weight boiling between 450° F. and 600° F.)

TABLE VII

| Run | Composition of Treated Waterflood, Percent by Weight | | | Additional Oil Recovered, Percent of Oil Originally in Place (OOIP) | Increase Injectivity Rate Percent |
|---|---|---|---|---|---|
| | Surfactant | Oil Recovery Agent | Water | | |
| 1 | 46.2 NH$_4$ sulfonate from light cycle gas oil. | 7.5 n-octanol | 46.3 | 29.0 | 429 |
| 2 | 42.4 NH$_4$ sulfonate from light cycle gas oil. | 15.2 n-octanol | 42.4 | 42.4 | 550 |
| 3 | 38.2 NH$_4$ sulfonate from light cycle gas oil. | 23.6 n-octanol | 38.2 | 48.0 | 606 |
| 4 | 33.7 NH$_4$ sulfonate from light cycle gas oil. | 32.6 n-octanol | 33.7 | 38.5 | 482 |
| 5 | 32.7 NH$_4$ sulfonate from kerosene. | 7.7 Surfynol [1] | 59.6 | 29.1 | 426 |
| 6 | 30.9 NH$_4$ sulfonate from cracked thermal cycle oil. | do | 61.4 | 32.3 | 586 |
| 7 | 31.0 NH$_4$ sulfonate from cracked thermal cycle oil. | 7.5 n-hexanol | 61.5 | 36.4 | 711 |
| 8 | 35.1 NH$_4$ sulfonate from cracked thermal cycle oil. | 5.4 n-butanol | 59.5 | 24.3 | 466 |
| 9 | 36.1 NH$_4$ sulfonate from cracked thermal cycle oil. | 3.6 n-butanol | 60.3 | 23.5 | 428 |
| 11 | 36.8 NH$_4$ sulfonate from cracked thermal cycle oil. | 1.7 n-butanol | 61.5 | 22.4 | 431 |
| 11 | 37.1 NH$_4$ sulfonate from cracked thermal cycle oil. | 0.7 n-butanol | 62.2 | 21.7 | 394 |
| 12 | 32.0 NH$_4$ sulfonate from cracked thermal cycle oil. | 5.4 n-hexanol | 62.6 | 29.8 | 686 |
| 13 | 32.9 NH$_4$ sulfonate from cracked thermal cycle oil. | 5.6 n-octanol | 61.5 | 33.8 | 644 |
| 14 | 32.8 NH$_4$ sulfonate from cracked thermal cycle oil. | 5.7 n-decanol | 61.5 | 31.5 | 409 |
| 15 | do | 5.7 n-dodecanol | 61.5 | 29.9 | 417 |
| 16 | do | 5.7 blend of n-hexanol [2] and n-decanol. | 61.5 | 30.4 | 521 |

[1] Surfynol is the tradename used for 3,5-dimethyl-1-hexyn-3-ol.
[2] A blend containing 50 percent by weight n-hexanol and 50 percent by weight n-decanol.

In comparing Tables I and VII, it may be perceived that very substantial increases in water injectivity and oil recovery are realized from the practice of the present invention.

EXAMPLE 3

A group of experiments was run to determine the effect, if any, of time of injection on total throughput necessary to reach the ultimate residual saturation. In carrying out these experiments Berea sandstone outcrop cores 2 inches in diameter and 3 inches in length were used and were saturated with 80 pale oil as described in Example 2. These cores were flooded with a 17% by weight treating composition solution comprising 46.2 percent ammonium sulfonate derived from light cycle gas oil, 46.2 percent of water and 5.5 percent of n-octanol. The time of injection of the treating composition was which was recovered. However, dramatic advantages on total throughput requirements are shown by these data for injecting treating composition in the initial stages of the waterflood.

TABLE VIII

| Time of Injection | Total Fluid Injected (P.V.) | Total Recovery (Percent OOIP) |
|---|---|---|
| Initially | 1.6 | 72.6 |
| After .17 P.V. injected at ROS$_1$ | 2.2 | 73.3 |
| | 2.8 | 72.3 |

EXAMPLE 4

A number of laboratory flood-pot tests were carried out using Berea sandstone cores 3 inches in diameter and 12 inches in length, which had been saturated with 80 pale oil as described in Example 2, with a sulfonate-alcohol composition being added to the flood at different points in time. In some of the runs, the composition was added at the beginning of the flood. In other runs, the composition was added after 50,000 parts per million of sodium chloride brine had been passed through the core until residual oil saturation ($ROS_1$) was reached. The quantity of the aqueous solution of sulfonate and alcohol which was added ranged from 4 percent of 1 pore volume to 17 percent of 1 pore volume. The results obtained in these floodpot tests are set forth in Table IX.

and were mounted horizontally. The cores were initially saturated with a brine solution containing 50,000 p.p.m. sodium chloride after which 80 pale oil was injected until irreducible water saturation was reached. Water was then passed through the cores until residual oil saturation ($ROS_1$) was reached.

After the cores were thus prepared 10 cc. slugs of various treating compositions were injected into the cores followed by further water injection which was continued until the second residual oil saturation point ($ROS_1$) was reached. The results of this group of experiments are summarized in Table X.

TABLE IX

| Injected Water Composition | Time and Amount of Slug Injection (Percent P.V.) | OOIP (cc.) | Oil Out at $ROS_1$ (cc.) | Initial Water Injectivity (cc./sec.) | Oil Out at $ROS_2$ (cc.) | Improved Water Injectivity (cc./sec.) | Δ ROS (Percent OOIP) | Change in Injectivity (Percent) | Total Recovery (Percent OOIP) |
|---|---|---|---|---|---|---|---|---|---|
| a | 17% at $ROS_1$ | 86 | 36.9 | .026 | 71.9 | .330 | 40.7 | 1,160 | 83.6 |
| b | 17% at $ROS_1$ | 85 | 35.6 | .022 | 76.3 | .220 | 47.9 | 900 | 89.8 |
| c | 17% at $ROS_1$ | 85 | 35.4 | .026 | 73.9 | .008 | 45.3 | Negative | 86.9 |
| d | 17% initially | 80 | | | 58.1 | | | | 72.6 |
| d | 17% after .17 P.V. injected | 76 | | | 55.7 | | | | 73.3 |
| d | 17% at $ROS_1$ | 81 | 35.6 | .010 | 58 | .039 | 28.4 | 293 | 72.3 |
| d | 4% initially | 80 | | | 48.1 | | | | 60.1 |
| d | 8% initially | 82 | | | 55.1 | | | | 67.2 |
| d | 8% at $ROS_1$ | 80 | 28.8 | .009 | 52.6 | .059 | 29.8 | 555 | 65.8 |
| d | 4% at $ROS_1$ | 78.5 | 28.2 | .008 | 46.4 | .045 | 23.2 | 462 | 59.1 |

Composition of Treated Water, in Percent by Weight:
a=46.2 percent NH₄ sulfonate derived from light cycle gas oil, 46.3 percent H₂O and 7.5 percent n-octanol.
b=42.4 percent NH₄ sulfonate derived from light cycle gas oil, 42.4 percent H₂O and 15.2 percent n-octanol.
c=38.2 percent NH₄ sulfonate derived from light cycle gas oil, 38.2 percent H₂O and 23.6 percent n-octanol.
d=46.2 percent NH₄ sulfonate derived from light cycle gas oil, 46.2 percent H₂O and 5.6 percent n-octanol.

TABLE X

| Treating Composition | | | | | Number of Runs | Avg. Add'nl. Oil Recovery (Percent OOIP) |
|---|---|---|---|---|---|---|
| Oil Recovery Agent | Percent | Surfactant | Percent | Percent Water | | |
| n-heptanoic acid | 5 | Light cycle gas oil sulfonate | 45 | 50 | 3 | 29.3 |
| 2-ethylhexanoic acid | 5 | do | 45 | 50 | 3 | 28.8 |
| 50% by weight lauric acid in ethyl alcohol | 10 | do | 40 | 50 | 2 | 27.3 |
| Tall oil heads | 5 | do | 45 | 50 | 4 | 29.6 |

EXAMPLE 5

Additional experiments were conducted utilizing fatty acids in the place of the alcohols previously used. In these experiments, Berea sandstone cores 3 inches in diameter and 12 inches in length were utilized and the treating composition was added at residual oil saturation ($ROS_1$). The treating composition used consisted of about 50 percent ammonium light cycle gas oil sulfonate, about 40 percent water and about 10 percent tall oil heads (a mixture consisting of approximately 18 percent saturated acids, 47 percent oleic acid, and 35 percent linoleic acid). In one group of three runs, an average of 25.8 percent of additional oil was recovered as a result of adding 30 percent pore volume of the treating composition at residual oil saturation.

In a different series of experiments, 6.7 percent pore volume of tall oil heads were initially injected at residual oil saturation followed by a 16.7 percent pore volume slug of ammonium light cycle gas oil sulfonate. An average additional oil recovery of 35.1 percent was observed from two runs utilizing this technique.

EXAMPLE 6

Another group of experiments were carried out in order to further evaluate organic acids for use with the present invention. Prior to these experiments Berea sandstone cores were cut 2 inches in diameter and 3 inches in length

EXAMPLE 7

To further illustrate one manner in which the present invention my be practiced, let us consider an actual field procedure which is undertaken when it is desired to practice the present invention in a relatively shallow field in the Southern portion of Oklahoma which is drilled on a uniform 40 acre spacing pattern to a producing depth of 3,000 feet. The producing formation is a sandstone having an average porosity of 20.5 percent with an average air permeability of 125 millidarcies. Water saturation after initial waterflood is 65 percent and thickness of the sand is 15 feet in the test area. Residual oil accounts for 35 percent of the pore space and is approximately 36° A.P.I. crude with a viscosity of about 5 centipoises. A five-spot pattern using existing wells consisting of four injection wells at the corner of a 40-acre square with a producing well at the center is chosen to provide an area having about 334,000 barrels of stock tank oil in place.

160,000 pounds of treating composition per well are used in the test area. This composition consists of 60,000 pounds of a 40 percent aqueous solution of ammonium sulfonate of a cracked light cycle gas oil having an average boiling range between about 300° F. and about 610° F. together with 10,000 pounds of octyl alcohol. A T fixture is located at the upper portion of the injection stream and variable speed proportioning pumps are placed on each arm of the T. One pump is placed in communication with a reservoir holding octyl alcohol, while the other pump is placed in communication with the reservoir holding the aqueous sulfonate solution. The output of these pumps is adjusted to produce a ten to one (by volume) ratio of sulfonate solution to alcohol. The treating composition thus produced is injected into the formation at a pressure of 1,000 p.s.i. and at a rate of 200 barrels per day per well until the total amount of treating composition has been disposed of underground while simultaneously withdrawing fluid from the recovery well. Subsequently, the injection wells are returned to continuous water injection at the rate of 300 barrels per day. Breakthrough of the sulfonate is noted in the recovery wells after approximately 6 months from initial injection of the treating composition. Ten years later it is found that an additional 50,000 barrels of oil have been recovered from the flooded area.

EXAMPLE 8

In a further test in the same shallow, watered-out production zone in a five-spot pattern substantially identical to that described above 100 barrels of decanol per well are injected as a single slug at the rate of 200 barrels per day per well under a pressure of 500 p.s.i. Upon completion of the decanol, injection of sodium dodecylbenzene sulfonate is initiated and continued at injection rate of 200 barrels per day per well at a pressure of 1000 p.s.i. until a total of 1,200 barrels of the sulfonate have been disposed of into the formation. Immediately thereupon injection of water is initiated at the rate of 300 barrels per day at a pressure of 1000 p.s.i.

Breakthrough of the sulfonate is noted in the recovery wells after approximately 6 months from initial injection of the treating composition. Ten years later it is found that an additional 50,000 barrels of oil have been recovered from the flooded area.

Although the composition and process of the invention have been described with a certain degree of particularity in order to convey, by example, a basic understanding of the invention sufficient to enable one of average skill in the art of petroleum production to practice the invention, it is to be expected that the specific conditions and ranges of some parameters herein described may be altered in some degree without departure from the basic principles underlying the invention. It is also contemplated that other compounds and mixtures of compounds not specifically mentioned or described in detail may be employed as the sulfonate and alcohol materials used in practicing the invention, provided only that such compounds and mixtures of compounds are characterized by the properties which have been generally ascribed to compounds and mixtures of compounds operative in practicing the invention. It is therefore intended that alterations and modifications in the process conditions and materials used which do not entail an abandonment of the basic concepts upon which the invention is bottomed shall be considered as circumscribed by the spirit and scope of the invention except as the same may be necessarily limited by the appended claims or reasonable equivalents thereof.

What is claimed is:

1. A method for recovering hydrocarbons from a petroliferous formation which comprises the steps of:
   (a) injecting into such formation:
      (i) an effective amount of an aqueous solution of a water-soluble surfactant, said amount of surfactant being above the critical micelle concentration and
      (ii) an effective amount of a water insoluble, oil soluble organic polar material as an "oil recovery agent," and
   (b) moving said composition in the formation toward a recovery well while withdrawing liquid from the formation through the recovery well.

2. The method defined in claim 1 wherein said "oil recovery agent" is an aliphatic alcohol having from about 6 to about 12 carbon atoms.

3. The method defined in claim 1 wherein said "oil recovery agent" is an organic acid containing about 4 or more carbon atoms.

4. A method for displacing oil from an oil bearing, subterranean formation which comprises injecting into said formation:
   (a) water having dissolved therein
   (b) from about 0.5 percent by weight to about 60 percent by weight of at least one X-alkyl aryl sulfonate compound wherein X is a cation and wherein the combining weight of the alkyl aryl organic portions of at least 90 percent by weight of said sulfonate compounds is from about 120 to about 218; and
   (c) an effective amount of a water insoluble, oil soluble organic polar material as an "oil recovery agent."

5. The method defined in claim 4 wherein said composition is at least about 60% saturated with said sulfonate.

6. The method defined in claim 5 wherein said "oil recovery agent" is chosen from the group consisting of organic acids having from about 4 to about 20 carbon atoms, and alcohols having from about 6 to about 12 carbon atoms.

7. The method defined in claim 6 wherein said sulfonate is prepared by sulfonating a cracked hydrocarbon distillate stream derived from the fractionation of crude oil and boiling between about 300° F. and 610° F.

8. The method defined in claim 7 wherein said composition is injected into said subterranean formation in an amount equivalent to between about 40 and about 400 pounds of alcohol and sulfonate per acre foot of the formation flooded.

9. The method defined in claim 8 wherein said solution is injected into the formation before the initial point of residual oil saturation is reached.

10. A method for recovering hydrocarbons from a petroliferous formation which comprises the steps of:
   (a) injecting into said formation prior to a water-flood an effective amount of a water insoluble, oil soluble organic polar material as an "oil recovery agent" and thereafter,
   (b) injecting into said formation immediately behind the "oil recovery agent" an effective amount of an aqueous solution of a water-soluble surfactant, and
   (c) moving said surfactant and "oil recovery agent" in the formation toward a recovery well while withdrawing fluid from the formation through the recovery well and wherein the total amount of the "oil recovery agent" and surfactant is the equivalent of from about 40 to about 400 pounds of "oil recovery agent" and surfactant per acre foot of the formation which is contacted by the injected material, and further wherein said "oil recovery agent" is present in an amount equal to that amount necessary to form a solution with said surfactant which is at least 50% saturated with said "oil recovery agent."

11. The method defined in claim 10 wherein said "oil recovery agent" is an aliphatic alcohol containing from about 6 to about 12 carbon atoms.

12. The method defined in claim 10 wherein said "oil recovery agent" is a fatty acid containing from about 14 to about 20 carbon atoms.

(References on following page)

References Cited

UNITED STATES PATENTS

| | | | |
|---|---|---|---|
| 2,669,306 | 2/1954 | Teter et al. | 166—9 |
| 2,808,109 | 10/1957 | Kirk | 166—42 |
| 2,927,637 | 3/1960 | Draper | 166—9 |
| 3,006,411 | 10/1961 | Holbrook | 166—9 |
| 3,111,985 | 11/1963 | Reisberg | 166—9 |
| 3,126,952 | 3/1964 | Jones | 166—8 |
| 3,131,759 | 5/1964 | Slusser et al. | 166—42 X |
| 3,134,433 | 5/1964 | Bocquet et al. | 166—9 |
| 3,135,326 | 6/1964 | Santee | 166—9 |
| 3,163,214 | 12/1964 | Csaszar | 166—9 |
| 3,137,345 | 6/1964 | Harvey et al. | 166—9 |
| 3,170,514 | 2/1965 | Harvey et al. | 166—9 |

STEPHEN J. NOVOSAD, *Primary Examiner.*

UNITED STATES PATENT OFFICE
CERTIFICATE OF CORRECTION

Patent No. 3,366,174                      January 30, 1968

Howard H. Ferrell et al.

It is hereby certified that error appears in the above numbered patent requiring correction and that the said Letters Patent should read as corrected below.

Column 7, line 34, for "uneacted" read -- unreacted --; columns 11 and 12, footnote 4, line 2 thereof, for "450° F. and 700° F.)" read -- 450° F. and 600° F.) --; column 11, line 59, for "Tables I and VII" read -- Tables VI and VII --; column 14, line 10, for "($ROS_1$)" read -- ($ROS_2$) --.

Signed and sealed this 22nd day of April 1969.

(SEAL)
Attest:

Edward M. Fletcher, Jr.                           EDWARD J. BRENNER
Attesting Officer                                  Commissioner of Patents